Sept. 15, 1936.　　D. W. THOMAS　　2,054,105
RING SEAL FOR BARRELS
Filed June 7, 1933

INVENTOR:
DAVID W. THOMAS
Kwis Hudson & Kent
ATTORNEYS

Patented Sept. 15, 1936

2,054,105

UNITED STATES PATENT OFFICE 2,054,105

RING SEAL FOR BARRELS

David W. Thomas, Youngstown, Ohio, assignor to The Niles Steel Products Company, Niles, Ohio, a corporation of Ohio Application June 7, 1933, Serial No. 674,640

9 Claims. (Cl. 220—61)

This invention relates to improvements in ring seals for barrels, that is to say means for completin the closure and sealing of steel barrels, drums, or the like. More specifically, the invention relates to a clamping band or split ring, together with means for drawing the ends of the ring together for the purpose of clamping the cover of the container down onto the rim of the container body.

One of the objects of the invention is the provision of a split ring for the purpose stated, so constructed as to be capable of being opened to a considerable extent, whereby it may be readily and easily assembled upon or disassembled from a drum and cover.

Another object is the provision of a link and lever clamping means permanently attached to the ring on one side of the split, and having a detachable connection with the ring on the other side of the split, so as not to interfere with whatever spreading of the ring is necessary in getting it onto or off of the drum.

Another object is the provision of means, such as a projection and socket connection between the adjacent ends of the ring, for preventing relative displacement of the ends of the ring.

Still another object is the provision of means for holding the link and lever in their proper planes when the clamping means is in operative position.

Other objects and features of novelty will appear as I proceed with the description of that embodiment of the invention which, for the purposes of the present application, I have illustrated in the accompanying drawing, in which—

Figure 3:
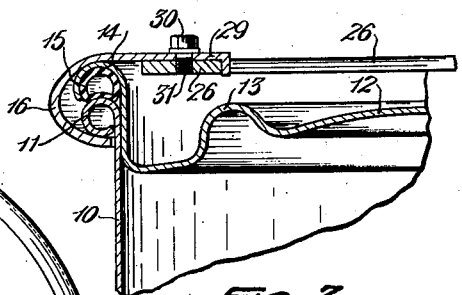
Fig. 3 is a fragmental vertical section of a drum, cover and closing ring, the section being taken on a plane corresponding substantially to the line 3—3 of Fig. 1.

In the drawing I have shown in Fig. 3 a fragment of a steel drum or barrel 10, the metal of the body of the drum being rolled at one end to form an encircling bead 11. The cover 12 is preferably depressed to some extent, particularly near the periphery, and may be formed if desired with a reenforcing circular corrugation 13. At its peiphery there is a flange 14, which may be curved more or less, which overhangs the bead 11 on the drum and within which is preferably mounted a gasket 15. I prefer to make this gasket of soft rubber, and if desired it may be tubular, as shown. Such drum and cover constructions are well known in the art.

Figure 5:
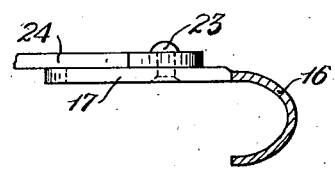
Fig. 5 is a detail sectional view taken substantially on the line 5—5 of Fig. 2.

The purpose of the ring seal of the present invention is to draw the cover 12 with its flange 14 down upon the bead 11 of the drum, compressing the gasket 15, whereby an air-tight seal is provided. The ring 16 is made of steel, preferably of fairly heavy gauge, and in cross section is semi-circular or C-shaped, as shown in Figs. 3 and 5. However, the particular cross sectional form may be varied more or less, the essential feature being that the internal surfaces of the ring shall have a camming effect upon the lower surface of the bead 11 and the upper surface of the flange 14 to draw them together when the ring is contracted by its clamping means. The ring is made continuous except for a single split, although it is within the purview of the invention in some of its aspects to form the ring of a plurality of pieces hinged or otherwise connected together.

At the ends of the ring adjacent the split I provide two flat ears 17 and 18 extending inwardly from the upper edge of the ring proper. In the present instance these ears are formed of a heavier gauge material than the ring itself and are welded to the ring, but it should be understood that they may be made integral with the ring if desired. The ear 17 is provided with a projection 19, and the ear 18 with a socket 20, which interengage when the ring is in clamping position and prevent relative movement of the ring ends in a radial direction, this being one of the important features of my invention.

Figure 4:
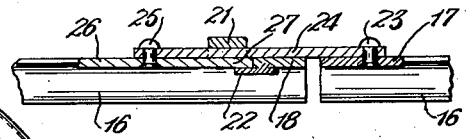
Fig. 4 is a detail sectional view taken substantially on the line 4—4 of Fig. 1.

Just behind the ear 18 there is another ear 21, also carried by the upper edge of the ring and extending inwardly, and bent up so as to stand in a plane parallel with the ears 17 and 18 but offset therefrom, as indicated in Fig. 4. I may also secure to the under surface of ear 18 a small plate or lip 22 which projects laterally for a short distance.

A pivot 23 extends upwardly from the ear 17. Upon it I mount a link 24. At the opposite end of this link there is another pivot 25, by means of which a lever 26 is pivotally hung from the link. The offsetting of the ear 21 from the ear 18 is just sufficient to provide easy clearance for the link 24 in moving from operative to inoperative position and vice versa.

Figure 1:
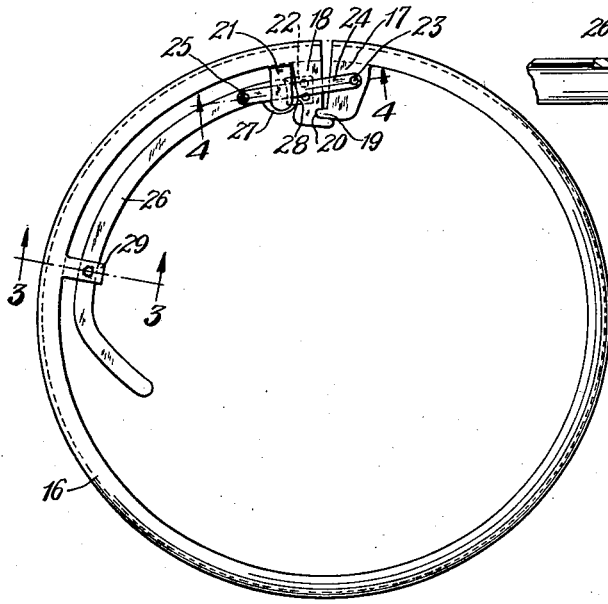
Figure 1 is a plan view of a ring embodying the invention, shown in its closed or clamping position.

That end of the lever 26 which is near the pivot 25 has a rounded head 27 that is adapted to enter the space between the ear 21 and the lip 22. The rear edge of ear 18 is made with a shallow rounded recess or bearing surface 28, and this surface cooperates with the rounded head 27 to constitute a rotatable connection when the lever is swung from the full-line position of Fig. 2 to the position of Fig. 1.

Suitable means is provided for holding the clamping lever in operative position, and this means may consist of a lip 29 extending inwardly from the upper edge of the ring and provided with a bore through which a screw 30 may be caused to extend and to enter a threaded opening 31 in the lever 26.

Figure 2:
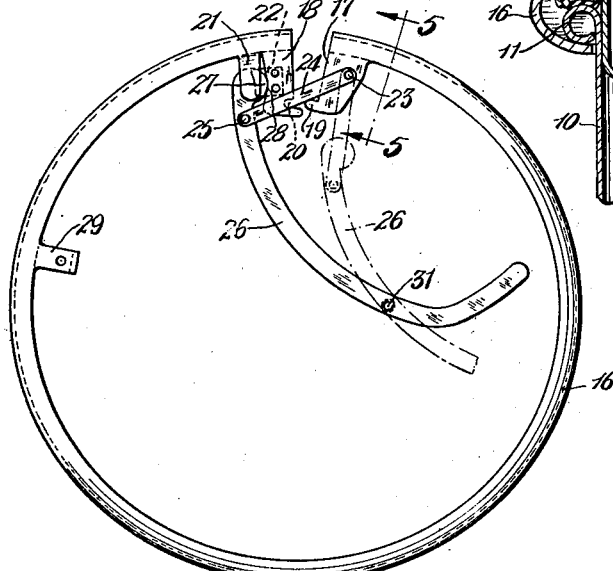
Fig. 2 is a similar view with the ring in unclamped position.

When the ring is to be placed in position upon a drum or barrel, the lever and link are moved to the dotted line position of Fig. 2, whereupon the ends of the ring can be readily sprung apart to whatever extent is necessary to enable the operator to place the ring over the bead 11 and the flange 14. The ring then, of its own resilience, will return to substantially the position indicated in Fig. 2, when the lever and link may be swung around from dotted line position to locate the rounded head 27 of the lever against the bearing surface 28 of ear 18. The operator then grasps the end of the lever and swings it to the position of Fig. 1, the projection 19 entering the socket 20, and the ends of the ring being drawn into the clamping position shown in Fig. 1, after which screw 30 may be put in place to hold the parts in operative relation. It will be noted that when the ring is closed the ears 18 and 21 hold the link 24 against movement out of its plane, while the head 27 of the lever is positioned between the lip 22 and the link 24, and thus held against movement out of its plane.

Variations from the described structure may be employed. Accordingly I desire it to be understood that the scope of the invention is to be regarded as defined exclusively by the appended claims, rather than by the foregoing description or the accompanying illustration.

Having thus described my invention, I claim:

1. A closing means for steel drums or the like, comprising a split ring, the ends of said ring adjacent the split thereof having inwardly projecting ears, clamping means carried by the ring and associated with both of said ears for drawing the ring into clamping position upon the drum, and means upon said ears adapted when the ring is drawn into clamping position to interlock and prevent relative movement of the ring ends in a radial direction.

2. In combination, a drum having an encircling bead at one end, a cover for the drum having a flange overhanging said bead, a split ring of C-shaped cross section embracing said bead and flange, the ends of said ring adjacent the split thereof having along their upper edges inwardly projecting ears lying in a plane parallel to the plane of the ring, clamping means carried by the ring for drawing the ring into clamping position on the drum, and means upon said ears adapted when the ring is drawn into clamping position to interlock and prevent relative movement of the ring ends in a radial direction.

3. In combination, a drum having an encircling bead at one end, a cover for the drum having a flange overhanging said bead, a split ring of C-shaped cross section embracing said bead and flange, the ends of said ring adjacent the split thereof having along their upper edges inwardly projecting ears lying in a plane parallel to the plane of the ring, a link pivotally connected to one of said ears, a lever rotatably associated with the other ear and pivotally connected with said link, whereby the movement of said lever in one direction tends to draw the adjacent ends of the ring together, and means upon said ears adapted when the ring is drawn into clamping position to interlock and prevent relative movement of the ring ends in a radial direction.

4. A closing means for steel drums or the like, comprising a split ring, the ends of said ring adjacent the split thereof having inwardly projecting ears, clamping means carried by the ring and associated with both of said ears for drawing the ring into clamping position upon the drum, and a projection and socket connection between said ears effective when the ring is in clamping position.

5. A closing means for steel drums and the like, comprising a split ring, the ends thereof adjacent the split having inwardly projecting ears, a link pivotally connected with one of said ears, a lever pivotally connected with said link, and cooperating means upon one end of the lever and upon the other ear for providing a detachable rotatable engagement, whereby movement of the lever in one direction moves the ends of the ring relatively in a circumferential direction.

6. A closing means for steel drums and the like, comprising a split ring of C-shaped cross section, the ends thereof adjacent the split having inwardly projecting ears, a link pivotally connected with one of said ears, a lever pivotally connected with said link, said lever having a curved end and said other ear having a bearing surface adapted to cooperate with the curved end of the lever, whereby a detachable rotatable engagement is formed between the lever and the last named ear for urging said ear toward the first named ear to bring the ends of the ring into clamping position.

7. A closing means for steel drums and the like, comprising a split ring, the ends thereof adjacent the split having inwardly projecting ears, a link pivotally connected with one of said ears, a lever pivotally connected with said link, cooperating means upon one end of the lever and upon the other ear for providing a detachable rotatable engagement, whereby movement of the lever in one direction moves the ends of the ring relatively in a circumferential direction, and means for preventing displacement of the link in a direction transverse to its plane of movement when the link is in clamping position.

8. A closing means for steel drums and the like, comprising a split ring of C-shaped cross section, the ends thereof adjacent the split having inwardly projecting ears, a link pivotally connected with one of said ears, a lever pivotally connected with said link, said lever having a curved end and said other ear having a bearing surface adapted to cooperate with the curved end of the lever, whereby a detachable rotatable engagement is formed between the lever and the last named ear for urging said ear toward the first named ear to bring the ends of the ring into clamping position, and means for maintaining the curved end of said lever in the same plane with said last named ear while the ring is in clamping position.

9. A closing means for steel drums and the like, comprising a split ring, one end of said ring adjacent the split thereof having an inwardly projecting flat ear, the other end of the ring adjacent the split thereof having two inwardly projecting flat ears offset from each other, a link pivotally connected with the first named ear and lying in a plane between said offset ears, and means providing a rotatable engagement between the lever and one of said offset ears.

DAVID W. THOMAS.